US008496169B2

(12) United States Patent
Christofferson

(10) Patent No.: US 8,496,169 B2
(45) Date of Patent: Jul. 30, 2013

(54) SYSTEM AND METHOD FOR ELECTRONIC TICKET VERIFICATION, IDENTIFICATION, AND AUTHORIZATION WITH A WIRELESS COMMUNICATION DEVICE

(75) Inventor: Bruce Christofferson, Camano Island, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 523 days.

(21) Appl. No.: 12/348,066

(22) Filed: Jan. 2, 2009

(65) Prior Publication Data
US 2010/0170947 A1 Jul. 8, 2010

(51) Int. Cl.
G06K 5/00 (2006.01)

(52) U.S. Cl.
USPC ... 235/382; 235/375; 235/382.5; 235/462.01; 235/470

(58) Field of Classification Search
USPC .............. 235/375, 380, 382, 382.5, 454, 435, 235/462.01, 470
See application file for complete search history.

(56) References Cited

U.S. PATENT DOCUMENTS

| 7,004,388 B2* | 2/2006 | Kohta | 235/381 |
|---|---|---|---|
| 7,471,199 B2* | 12/2008 | Zimmerman et al. | 340/572.1 |
| 7,487,112 B2* | 2/2009 | Barnes, Jr. | 705/26.8 |
| 7,693,797 B2* | 4/2010 | Ekberg | 705/67 |
| 7,703,681 B2* | 4/2010 | Lee et al. | 235/462.01 |
| 7,865,141 B2* | 1/2011 | Liao et al. | 455/41.2 |
| 2003/0065805 A1* | 4/2003 | Barnes, Jr. | 709/231 |
| 2004/0188520 A1* | 9/2004 | Kohta | 235/382 |
| 2005/0242921 A1* | 11/2005 | Zimmerman et al. | 340/5.2 |
| 2005/0283444 A1* | 12/2005 | Ekberg | 705/67 |
| 2006/0293929 A1* | 12/2006 | Wu et al. | 705/5 |
| 2007/0276944 A1* | 11/2007 | Samovar et al. | 709/225 |
| 2007/0293155 A1* | 12/2007 | Liao et al. | 455/41.2 |
| 2008/0052192 A1* | 2/2008 | Fisher | 705/26 |
| 2008/0154623 A1* | 6/2008 | Derker et al. | 705/1 |
| 2008/0223940 A1* | 9/2008 | Lee et al. | 235/494 |

* cited by examiner

Primary Examiner — Daniel Hess
Assistant Examiner — Paultep Savusdiphol
(74) Attorney, Agent, or Firm — Hartman & Citrin LLC

(57) ABSTRACT

An enhanced security system utilizes a consumer wireless device and independent secure servers to enhance identification and authentication of the electronic ticketing. The consumer may make an eTicket purchase using a network, such as the Internet, in a conventional manner. The server involved in the purchase may send an eTicket confirmation to a consumer wireless device. However, master records of the transaction are sent via a secure link to a vendor server, typically associated with a wireless service provider. At a point just-in-time, the vendor server transmits symbology to the consumer wireless device and transmits additional data related to the symbology to a security server. When the consumer arrives with the eTicket, the consumer also uses the displayed symbology on the consumer wireless device. The symbology is scanned and compared with data transmitted from the vendor server to the security server. If authenticated, the eTicket may be authenticated. In addition, a near field communicator in the consumer wireless device may be programmed to provide additional security. The programmed NFC may be scanned to provide additional authentication.

14 Claims, 3 Drawing Sheets

SYSTEM AND METHOD FOR ELECTRONIC TICKET VERIFICATION, IDENTIFICATION, AND AUTHORIZATION WITH A WIRELESS COMMUNICATION DEVICE

BACKGROUND OF THE INVENTION

1. Field of the Invention

The present invention is directed generally to security systems and, more particularly, to a system and method for electronic ticket verification, identification, and authorization using a wireless communication device.

2. Description of the Related Art

Security systems, such as airline security, comprise a single security checkpoint in an airport. The Transportation Services Administration (TSA) checks a boarding pass and requires photo identification, such as a driver's license. Once an individual passes through the TSA security checkpoint, no further security measures are taken. Instead, the security guard at the TSA security checkpoint reviews the boarding pass and photo identification and puts an approval mark on the boarding pass using a rubber stamp.

At the departure gate, the traveler merely presents the boarding pass with rubber stamp to the airline agent at the gateway. The airline agent forms no additional identity verifications, but merely relies on the stamped boarding pass. Unfortunately, the single security checkpoint does not prevent the exchange of a hand-stamped boarding pass to an unauthorized individual.

A trial security system currently being tested at several airports throughout the U.S. uses an individual cell phone in conjunction with a conventional security check. In this embodiment, a user makes a reservation using a computer in a conventional manner. That is, the user may access a network, such as the Internet, to visit a website supported by the airline on which the user wishes to travel or the web site of a travel agency, or the like. The reservation is made and the user receives an electronic ticket or "eTicket." As part of the reservation process, the user provides the phone number for the user's wireless communication device (e.g., a cell phone). Upon completion of the reservation process, the airline sends an e-mail message to the user's wireless communication device. Integral with the e-mail is a symbology, sometimes referred to as a barcode. However, many symbologies today are two dimensional in nature as opposed to the linear one-dimensional barcode used in grocery stores. The symbology is stored within the user wireless device until the user arrives at the airport and passes through the TSA security checkpoint. At the TSA security checkpoint, the symbology from the airline e-mail is displayed and read by a symbology reading device at the TSA checkpoint, if the scanned symbology matches data delivered to the TSA security checkpoint by the airline. Unfortunately, this approach is susceptible to manipulation. Because the symbology is generated by the airline and delivered to the consumer wireless device at the time of reservation, the symbology may be transferred from one wireless device to another. At the TSA security checkpoint, there is no technique by which they can detect that the symbology has been transferred to a different wireless communication device.

Therefore, it can be appreciated that there is a significant need for a security system that minimizes the opportunities for manipulation and a security breach.

BRIEF DESCRIPTION OF THE SEVERAL VIEWS OF THE DRAWING(S)

DETAILED DESCRIPTION OF THE INVENTION

A security system designed in accordance with the present disclosure utilizes a number of different techniques.

Figure 1:
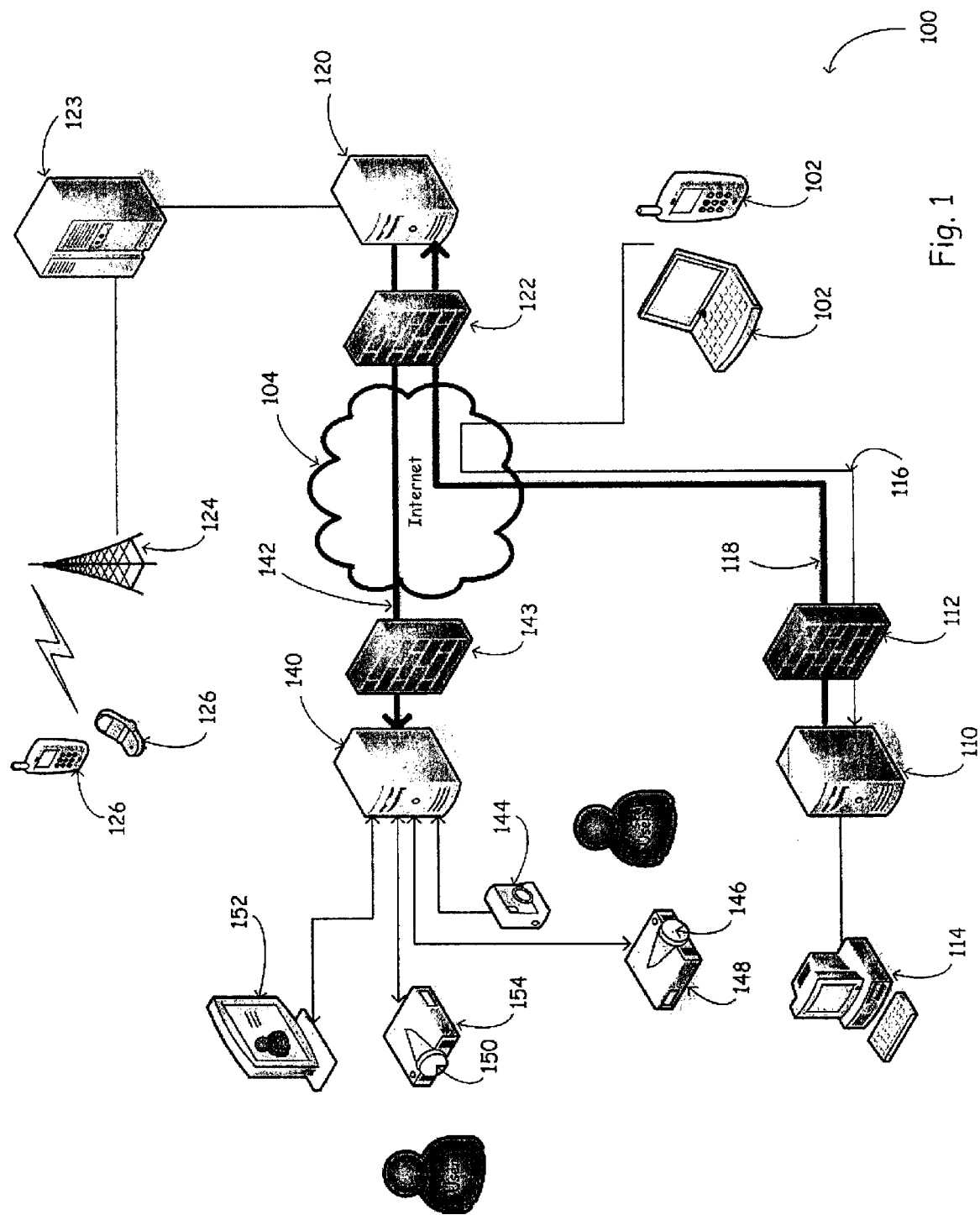
FIG. 1 illustrates an exemplary system architecture constructed in accordance with the present teachings.

The present disclosure is embodied in an exemplary system 100 illustrated in FIG. 1. The example of FIG. 1 is directed to airline security. However, those skilled in the art will appreciate that the system 100 may be utilized in other situations where ticket verification and identification are desired.

As illustrated in FIG. 1, a user operates a web-enabled consumer device 102, such as a computer or a web-enabled wireless device. The web-enabled consumer device 102 is coupled to a wide-area network 104, such as the Internet. In operation, the consumer operates the web-enabled consumer device 102 to access a server, such as an airline ticket server 110, via the Internet 104. A firewall 112 operates in a conventional manner to protect the airline ticket server 110 from attacks, such as a denial-of-service attack. A customer support system 114 may be operated by a customer service representative of the airline in the event the consumer has problems making a reservation.

FIG. 1 illustrates a communication link 116 that effectively couples the web-enabled consumer device 102 to the airline ticket server 110 via the Internet 104. Those skilled in the art will recognize that the communication between the web-enabled consumer device 102 and the airline ticket server 110 occurs via a series of data packets that may be transmitted back and forth between the devices. However, this connection is illustrated in FIG. 1 as the communication link 116.

The reservation process occurs in a conventional manner. That is, the consumer selects a desired date and flight. The consumer generally pays for the reservation using a credit card. In some cases, the consumer may be redeeming frequent flyer miles or have credits from a previous reservation. No matter the form of payment, at the end of the process, the consumer has made an airline reservation.

In operation, the airline ticket server 110 requests the phone number of a wireless device 126 owned by the consumer and also requests personally identifiable information (PII) from the consumer. The PII may take several forms, such as a password, personal identification number (PIN), passport number, selected digits from the consumer's social security number, and the like. In response to the request from the airline ticket server 110, the consumer enters the PII using the web-enabled consumer device 102. The use of the PII in subsequent identification processes will be described in detail below. At the end of this process, the user has a completed reservation with the selected airline.

While cell phones are currently being tested using symbologies transmitted by the airline, the system 100 does not permit the airline ticket server 110 to generate the symbology. Rather, the airline ticket server 110 transmits the PII and other reservation information to a vendor server 120 via a communication link 118 and the Internet 104. The vendor server 120 securely stores a master record of the eTicket transaction, including reservation details, passenger information, the phone number of the consumer wireless device 126, and the PII.

The thick line of the communication link 118 in FIG. 1 simply serves to illustrate that the communication link 118 is part of a wideband connection. However, other forms of the communication link 118 are possible. The master record is securely transmitted to the vendor server 120 using conventional techniques, such as a virtual private network (VPN), data encryption or the like. The vendor server 120 may also operate in conjunction with a firewall 122, similar in operation to the firewall 112. In an exemplary embodiment, the vendor server 120 is associated with a wireless service provider. It should be noted that the airline ticket server 110 does not generate any symbology and, at this point in the operation, no symbology has been generated and no symbology has been transmitted to the consumer. Even though the consumer may typically make the reservation days or weeks in advance, no security information is transmitted to the consumer and no security information, such as symbology, is generated by the airline ticket server 110. Rather, the PII and master records of eTicket information is securely store within the vendor server 120.

As will be described in greater detail below, the vendor server 120 generates a symbology shortly before the data is needed by the consumer. The symbology may be a unidimensional symbology, such as a bar code. Alternatively, the symbology may be a multi-dimensional symbology in a rectangular pattern, circular pattern, in black and white, color, or the like. The system 100 is not limited by any specific form in which the symbology may be used. The symbology is delivered to a cellular network infrastructure 123 and transmitted, via a base station 124 to a consumer wireless device 126. The consumer wireless device 126 may be a web-enabled device, such as the web-enabled consumer device 102 or it may be a conventional cell phone. In operation, the symbology is transmitted to the consumer wireless device 126 just-in-time for the consumer to check in at the TSA security checkpoint. Thus, security is enhanced by generating the symbology in the highly secure vendor server 120 and transmitting the symbology to the consumer wireless device only a short time before it is needed. This process minimizes opportunities for the symbology to be replicated or manipulated.

At approximately the same time (i.e., just-in-time) the vendor server 120 delivers the symbology, or data related to the symbology, to an airport security server 140 via a communication link 142 using the Internet 104. A firewall 143 between the airport security server 140 and the Internet 104 operates in a manner described above with respect to the firewalls 112 and 122 to protect the airport security server 140. The just-in-time delivery of data related to the symbology enhances security by minimizing opportunities for the data to be compromised within the airport security server 140 or unauthorized access by individuals using the airport security server. The data may be transmitted from the vendor server 120 to the airport security server 140 via a VPN or data encryption to provide security for the data.

In accordance with TSA recommendations, the consumer must arrive at the airport well in advance of the scheduled departure time. If the reservation is on an international flight, the consumer may be required to arrive even earlier than is required for a domestic flight. In either event, it is important that the necessary symbology be provided to the consumer before the consumer arrives at the TSA security checkpoint. Accordingly, the term "just-in-time" may be taken to mean approximately one-three hours prior to the scheduled departure time. Although the specific advance time may vary, the goal is to provide the security data (e.g., the symbology) to the consumer wireless device 126 and the airport security server 140 in advance of the consumer's arrival at the TSA security checkpoint. If the consumer arrives very early at the airport, or wishes to make last-minute changes to the reservation, such as departing on an earlier flight, the consumer may be required to go to the airline ticket counter. Upon receipt of the necessary information, the airline ticket counter may, via the airport security server 140, request downloading of the master record and other data, such as data related to the symbology, from the vendor server 120. In response to this request, the vendor server may send the required data. The vendor server may also transmit the symbology to the consumer wireless device 126 via the base station 124 in response to a request from the airport security server 140. This allows the necessary data to be delivered to the consumer wireless device 126 and to the airport security server to permit an early check in or a change to the consumer's travel plans.

By the time the consumer arrives at the TSA security checkpoint, the symbology has been transmitted from the base station 124 to the consumer wireless device 126 and data has been transmitted from the vendor server 120 to the airport security server 140.

At the TSA checkpoint, the consumer has the boarding pass validated. During the validation process, a camera 144 takes a photograph of the individual. The camera 144 may typically be a digital camera and the digital image is transmitted from the camera 144 to the airport security server 140 and stored in association with the data already within the airport security server for the particular individual. The consumer provides the boarding pass and also provides the consumer wireless device 126. A symbology reader 146 reads the symbology displayed on a display 172 (see FIG. 2) of the consumer wireless device 126.

At the same time, recall that the vendor server 120 transmitted the symbology or data related to the symbology to the airline security server 140 just in time for use at the TSA checkpoint. When the consumer arrives at the checkpoint and provides the symbology on the display 172 of the consumer wireless device 126, that data is transmitted back to the airport security server 140 for comparison with the data just delivered from the vendor server 120. If the symbology on the display of the consumer wireless device 126 provides a match with the data stored in that airport security server 140, the consumer is authenticated.

In one embodiment, the symbology scanner 146 is mounted integrally with or near a near-field communicator (NFC) 148. In an exemplary embodiment, the NFC 148 is an NFC writer capable of programming an NFC device 174 (see FIG. 2) mounted within the consumer wireless device 126. The NFC writer 148 and the NFC device 174 may be constructed in accordance with conventional standards, such as ISO 14443. In a typical embodiment, NFC systems have an extremely short communication range of approximately 10 cm. In an exemplary embodiment, the NFC device 174 within the consumer wireless device 126 is capable of being programmed by the NFC writer 148.

In operation, the NFC writer 148 may program the NFC device 174 at the same time that the display 172 of the consumer wireless device is being scanned by the symbology scanner 146. At that point in time, the NFC device 174 within the consumer wireless device 126 is sufficiently close to the NFC writer 148 to permit the necessary programming. Thus, the scanning operation of the symbology on the display 172 occurs at essentially the same time as the programming of the NFC device 174 by the NFC writer 148. When the symbology on the display 172 of the consumer wireless device 126 is read by the symbology scanner 146, a date/time stamp may be created by the TSA. The date/time stamp may be used in conjunction with some portion of the PII, or other portion of the master record of the eTicket, to generate a "seed" for storage on the NFC device 174. The seed is used to create a unique code sequence that may be stored on the NFC device 174. The actual data programmed into the NFC 174 may typically be encrypted. A copy of the data stored on the NFC device 174 is also provided to the airport security server 140.

Assuming that the necessary identification was presented at the TSA checkpoint and the symbology data transmitted just-in-time to the airport security server 140 authenticates the symbology shown on the display 172 of the consumer wireless device 126, the consumer has been authenticated and may pass through the TSA security checkpoint. At the same time, the NFC writer 148 has programmed the NFC device 174 contained within the consumer wireless device 126. At this stage, the consumer may still have a significant amount of time before actually boarding the aircraft. Additional security measures, described below, help assure that the authenticated boarding pass is not subsequently utilized by an unauthorized individual.

At the boarding gate, conventional security systems have the airline gate agent look at the stamped boarding pass. The agent typically uses a barcode scanner, or other symbology reader, to authenticate the boarding pass. However, no connection is made between the boarding pass and the individually actually boarding the aircraft. In contrast, the system 100 provides additional security. At the airline checkpoint, the symbology on the display 172 of the consumer wireless device 126 is scanned by a symbology reader 150. Data from the symbology reader 150 is relayed to the airport security server 140. In response to this information, the airport security server 140 provides an image of the photograph taken by the camera 144 at the TSA security checkpoint. The image of the passenger is shown on a video display monitor 152 at the boarding gate. Thus, the airline agent has an image of the passenger on the video display monitor 152 to assure that the person actually boarding the aircraft is the person who checked through the TSA security checkpoint. At the same time, an NFC reader 154, which may advantageously be mounted integrally with the symbology reader 150 can read the data programmed into the NFC device 174 within the consumer wireless device 126. This data is also compared with the NFC programmed data stored in the airport security server 140. This process helps authenticate that the consumer wireless device 126 is the same consumer wireless device used to authenticate the passenger at the TSA security checkpoint. While the symbology on the display 172 may be forwarded to another wireless device using wireless technology, it is very difficult to replicate data stored in encrypted form on the NFC device 174. Thus, security is enhanced by a number of factors. First, the airline ticket server 110 does not generate any security data and does not deliver any security data to the consumer wireless device. Rather, a master record of eTicket information is securely stored on the vendor server 120. At a point just-in-time for the consumer to pass through the TSA security checkpoint, the security data, in the form of symbology, is transmitted to the consumer wireless device 126. At the same time, corresponding data is delivered through a secure link to the airport security server 140. As the consumer passes through the TSA security checkpoint, the symbology displayed on the consumer wireless device 126 is compared with security data stored in the airport security server 140. A photograph of the passenger is also taken at the same time and stored for use by the airline security agent at the boarding gate. Furthermore, programming the NFC device 174 in the consumer wireless device at the security checkpoint provides greater assurance that the symbology is not duplicated once the consumer has passed through the TSA security checkpoint. All of these processes tend to increase security.

Figure 2:
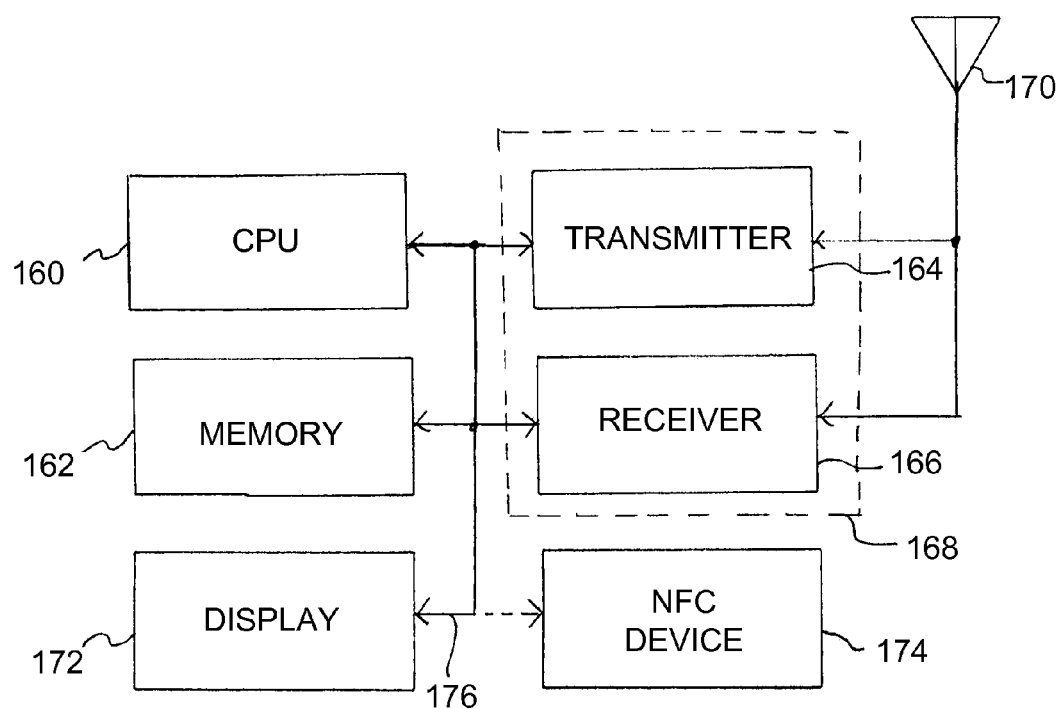
FIG. 2 is a functional block diagram of a wireless communication device constructed in accordance with the present teachings.

FIG. 2 is a functional block diagram of a consumer wireless device, such as the consumer wireless device 126. The consumer wireless device 126 includes a central processing unit (CPU) 160 and a memory 162. In general, the memory 162 provides instructions and data for execution by the CPU 160. The CPU 160 may be implemented by a variety of known technologies, such as a conventional microprocessor, application-specific integrated circuit, programmable gate array, or the like. CPU 160 is not limited by the particular form of hardware used in the implementation. Similarly, the memory 162 may be implemented using a variety of known technologies and may include random access memory, read only memory, flash memory, programmable memory, and the like. In one embodiment at least a portion of the memory 162 may be formed integrally with the CPU 160.

The consumer wireless device 126 also includes a transmitter 164 and receiver 166 to permit conventional bi-directional communication between the consumer wireless device and the wireless service provider via the base station 124. The transmitter 164 and receiver 166 operate in a conventional manner that need not be described in greater detail herein. In an exemplary embodiment, the transmitter 164 and receiver 166 share circuit components and are implemented as a transceiver 168. The transceiver 168 is coupled to an antenna 170, which may be an internal or external antenna depending on the engineering choices made to implement the consumer wireless device 126.

Also illustrated in FIG. 2 is the display 172. The display 172 may be monochromatic or color. If the display 172 is a color display, the symbology may be in the form of color-encoded symbologies. The display 172 operates in a conventional manner that need not be described in greater detail herein.

Also mounted integrally within the consumer wireless device 126 is a NFC device 174. As described above, the NFC device 174 is used in conjunction with data displayed on the display 172 to provide a high degree of security and authentication of the consumer. In one embodiment, the NFC device 174 is an active device and coupled electronically to other components in the consumer wireless device 126. In another embodiment, the NFC device 174 is a passive device that requires no power.

The various components described above are coupled together by a bus system 176. A typical device may include an address bus, data bus, power bus, control bus, and the like. For the sake of convenience, those various buses are illustrated herein as the bus system 176.

Figure 3:
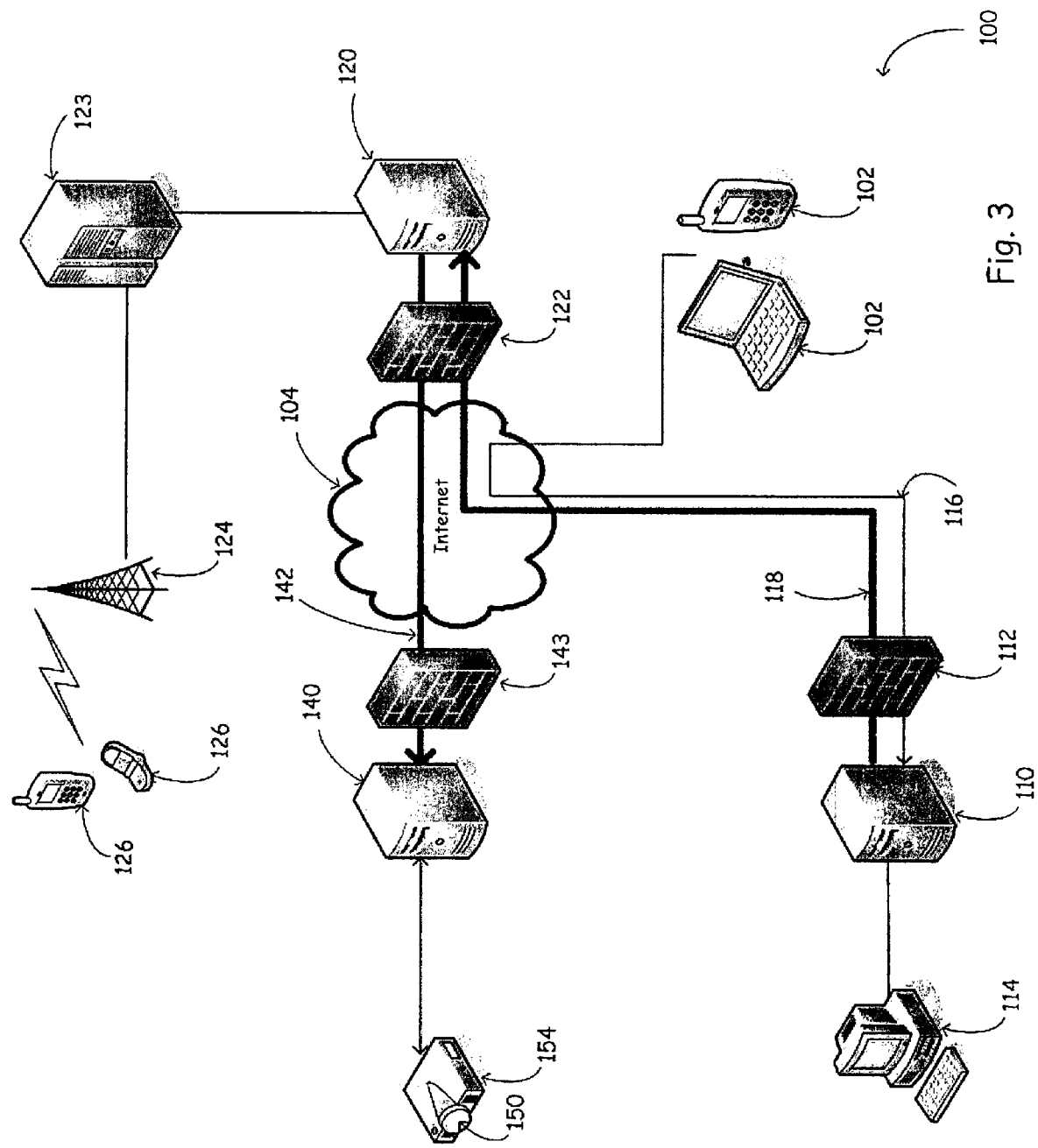
FIG. 3 is an alternate exemplary embodiment of a system architecture constructed in accordance with the present teachings.

FIG. 3 illustrates an alternative embodiment that may be used in a situation where only a single security checkpoint exists. For example, the exemplary embodiment in FIG. 3 may be used to provide ticket verification and authorization for concerts, sporting events, special events, and the like. Most of the components illustrated in FIG. 3 have already been described with respect to FIG. 1 and have identical reference numbers. In operation, the consumer operates the web-enabled consumer device 102 to order tickets via the ticket server 110. As with the embodiment illustrated in FIG. 1, the ticket server 110 does not transmit symbology data to the consumer wireless device 126 upon completion of the ticket purchase. Rather, the ticket server 110 transmits the master record, including eTicket information to the vendor server 120. The master record may also include the PII data discussed above. At a point just-in-time prior to the event, the vendor server 120 generates a symbology, using the master record data and/or PII, and transmits the symbology to the consumer wireless device 126 via the base station 124. In addition, the vendor server 120 transmits data to the security server 140.

In operation, the consumer may have a printed eTicket and arrives at the venue in advance of the starting time of the event. At that point in time, the consumer wireless device 126 contains a symbology for display on the display 172 and the security server 140 contains corresponding data for comparison. The consumer may present the eTicket and the consumer wireless device 126.

One distinction between the embodiment in FIGS. 1 and 3 is that the NFC device 174 (see FIG. 2) may be remotely programmed during the transmission of the symbology from the base station 124 to the consumer wireless device 126. Thus, when the consumer arrives at the gateway, the symbology and data for the NFC device 174 have been delivered just-in-time. In addition, the server 120 sends data related to the data stored in the NFC device 174 to the security server 140.

When the consumer presents the eTicket in the consumer wireless device 126, a symbology reader 150 can read the symbology shown on the display 172 of the consumer wireless device 126. At the same time, an NFC reader 154 reads the data stored in the NFC device 174 in the consumer wireless device 126. The symbology data scanned by the symbology reader 150 and the data from the NFC device 174, as read by the NFC reader 154, are provided to the security server 140. A match between the two independent forms of data indicates that the ticket and consumer are authenticated. Thus, the system illustrated in the embodiment of FIG. 3 provides enhanced security by providing the symbology and NFC data just-in-time to minimize the chances for manipulation.

The foregoing described embodiments depict different components contained within, or connected with, different other components. It is to be understood that such depicted architectures are merely exemplary, and that in fact many other architectures can be implemented which achieve the same functionality. For example, FIGS. 1 and 3 illustrate a very simplified embodiment of a typical wireless network architecture. Those skilled in the art will appreciate that a typical wireless network infrastructure includes a large number of base stations 124 and other supporting network elements that, for the sake of clarity, have not been illustrated herein. Similarly, the communication between the various network elements via the Internet may be accomplished through connections on a private network. The connections in FIG. 1 between the camera 144, display 152, symbology scanners 146 and 150, and the connection from the NFC writer 148 and NFC reader 154 to the airport security server 140 may be hardwired or may be secure wireless connections. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A method, comprising:
receiving, at a security server from a vendor server, a symbology, the symbology associated with an electronic ticket purchased by a consumer and associated with personally identifiable information provided by the consumer;
after receiving the symbology from the vendor server, receiving, at the security server, the symbology from a wireless device of the consumer located at a first checkpoint;
comparing, by the security server, the symbology received from the vendor server with the symbology received from the wireless device of the consumer at the first checkpoint;
if the symbology received from the wireless device of the consumer at the first checkpoint matches the symbology received from the vendor server, authenticating, by the security server, the consumer at the first checkpoint;
while comparing the symbology received from the vendor server with the symbology received from the wireless device of the consumer at the first checkpoint and authenticating the consumer,
receiving, at the security server, a digital image of the consumer captured at the first checkpoint, and
receiving, at the security server, data stored, at the first checkpoint, on the wireless device of the consumer;
receiving, at the security server, the symbology from the wireless device of the consumer located at a second checkpoint; and
in response to receiving the symbology from the wireless device of the consumer located at the second checkpoint, providing, by the security server, a copy of the digital image of the consumer to the second checkpoint, receiving, at the security server, the data read, at the second checkpoint, from the wireless device of the consumer, comparing, by the security server, the data read at the second checkpoint with the data stored at the first checkpoint, and if the digital image captured at the first checkpoint matches the consumer at the second checkpoint and the data read at the second checkpoint matches the data stored at the first checkpoint, then authenticating the consumer at the second checkpoint.

2. The method of claim 1, wherein the data stored, at the first checkpoint, on the wireless device of the consumer is stored on a near-field communication device in the wireless device of the consumer.

3. The method of claim 1, wherein the data stored, at the first checkpoint, on the wireless device of the consumer comprises at least one of a time stamp corresponding to a time of reading, at the first checkpoint, the symbology on the wireless device of the consumer or a portion of the personally identifiable information provided by the consumer.

4. The method of claim 1, wherein the symbology is received at the security server from the vendor server at a time that the consumer is approaching the first checkpoint.

5. The method of claim 4, wherein the time that the consumer is approaching the first checkpoint is determined based on a scheduled departure time associated with the electronic ticket purchased by the consumer.

6. The method of claim 1, wherein the symbology is received at the security server from the vendor server and received at the wireless device of the consumer from the vendor server at a time that the consumer is approaching the first checkpoint.

7. The method of claim 1, wherein the personally identifiable information comprises a password, personal identification number, passport number, and selected digits from a social security number associated with the consumer.

8. A security server, comprising:
a processor; and
a method storing instructions that, when executed by the processor, cause the processor to perform operations comprising
receiving, from a vendor server, a symbology, the symbology associated with an electronic ticket purchased by a consumer and associated with personally identifiable information provided by the consumer,
after receiving the symbology from the vendor server, receiving the symbology from a wireless device of the consumer located at a first checkpoint,
comparing the symbology received from the vendor server with the symbology received from the wireless device of the consumer at the first checkpoint,
if the symbology received from the wireless device of the consumer at the first checkpoint matches the symbology received from the vendor server, authenticating the consumer at the first checkpoint,
while comparing the symbology received from the vendor server with the symbology received from the wireless device of the consumer at the first checkpoint and authenticating the consumer,
receiving a digital image of the consumer captured at the first checkpoint, and
receiving data stored, at the first checkpoint, on the wireless device of the consumer,
receiving the symbology from the wireless device of the consumer located at a second checkpoint, and
in response to receiving the symbology from the wireless device of the consumer located at the second checkpoint,
providing a copy of the digital image of the consumer to the second checkpoint,
receiving the data read, at the second checkpoint, from the wireless device of the consumer,
comparing the data read at the second checkpoint with the data stored at the first checkpoint, and
if the digital image captured at the first checkpoint matches the consumer at the second checkpoint and the data read at the second checkpoint matches the data stored at the first checkpoint, then authenticating the consumer at the second checkpoint.

9. The security server of claim 8, wherein the data stored, at the first checkpoint, on the wireless device of the consumer is stored on a near-field communication device in the wireless device of the consumer.

10. The security server of claim 8, wherein the data stored, at the first checkpoint, on the wireless device of the consumer comprises at least one of a time stamp corresponding to a time of reading, at the first checkpoint, the symbology on the wireless device of the consumer or a portion of the personally identifiable information provided by the consumer.

11. The security server of claim 8, wherein the symbology is received at the security server from the vendor server at a time that the consumer is approaching the first checkpoint.

12. The security server of claim 11, wherein the time that the consumer is approaching the first checkpoint is determined based on a scheduled departure time associated with the electronic ticket purchased by the consumer.

13. The security server of claim 8, wherein the symbology is received at the security server from the vendor server and received at the wireless device of the consumer from the vendor server at a time that the consumer is approaching the first checkpoint.

14. The security server of claim 8, wherein the personally identifiable information provided by the consumer comprises a password, a personal identification number, a passport number, and selected digits from a social security number associated with the consumer.

* * * * *